July 7, 1970   E. CHAPMAN   3,519,204
TEMPERATURE CONTROL APPARATUS
Filed May 8, 1968   2 Sheets-Sheet 1

INVENTOR.
Everett Chapman
BY
Frederick J. Olsson
ATTORNEY.

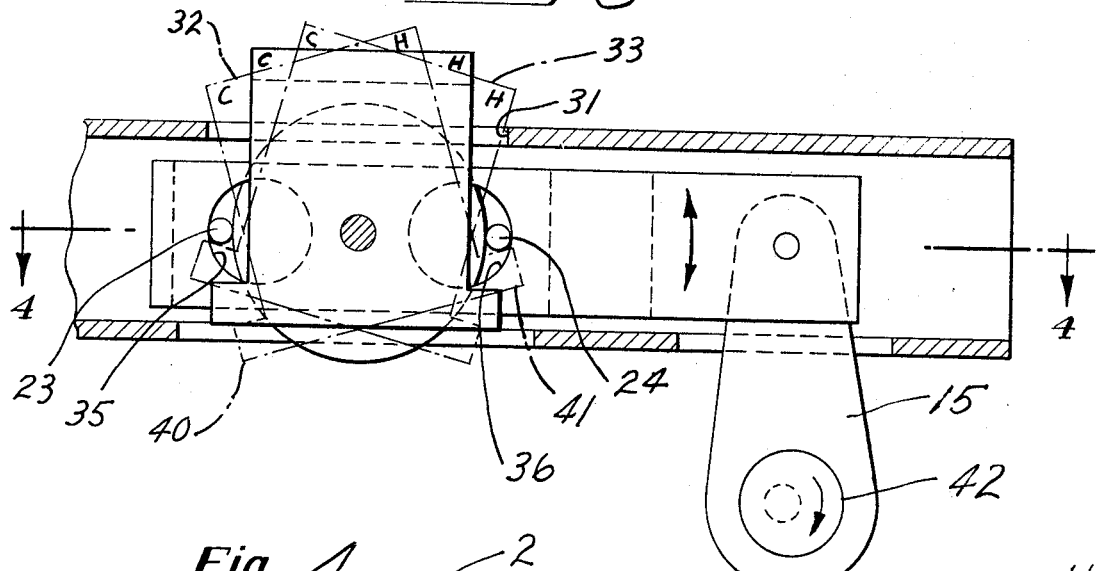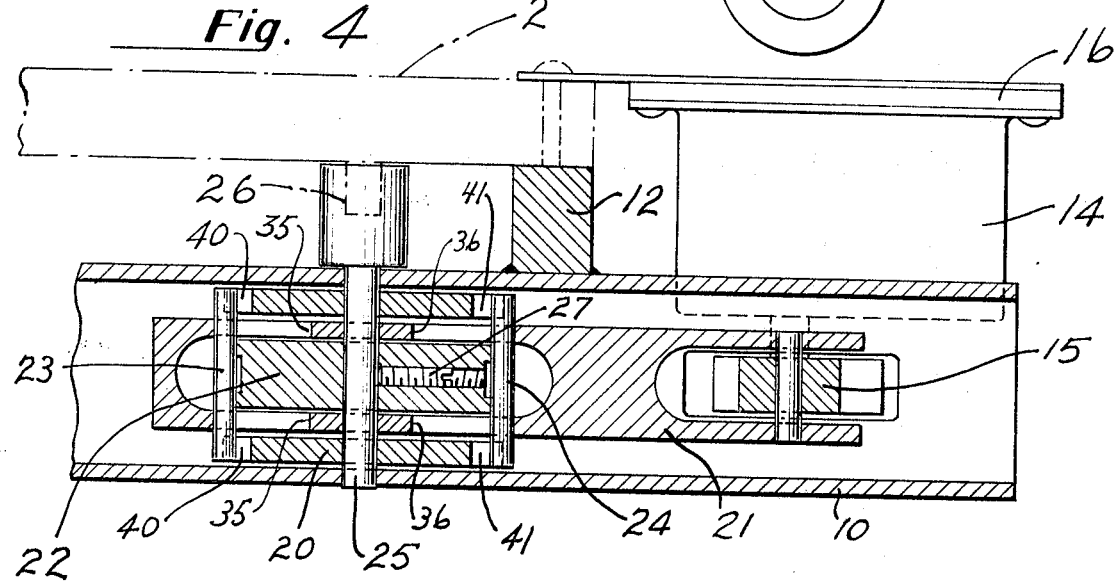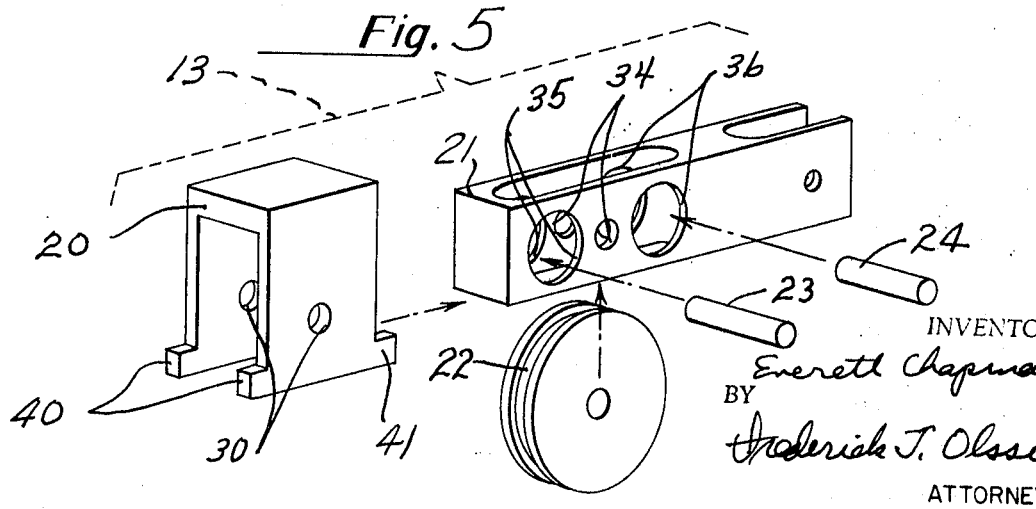

United States Patent Office 3,519,204
Patented July 7, 1970

3,519,204
TEMPERATURE CONTROL APPARATUS
Everett Chapman, P.O. Box 207,
West Chester, Pa. 19380
Filed May 8, 1968, Ser. No. 727,593
Int. Cl. G05d 23/22
U.S. Cl. 236—70  1 Claim

ABSTRACT OF THE DISCLOSURE

A thermo-couple on the article to be heated, a pyrotroller needle driven by the thermo-couple signal and a drive means for moving the pyrotroller contactor at a predetermined rate either up or down the scale.

---

Figure 1:
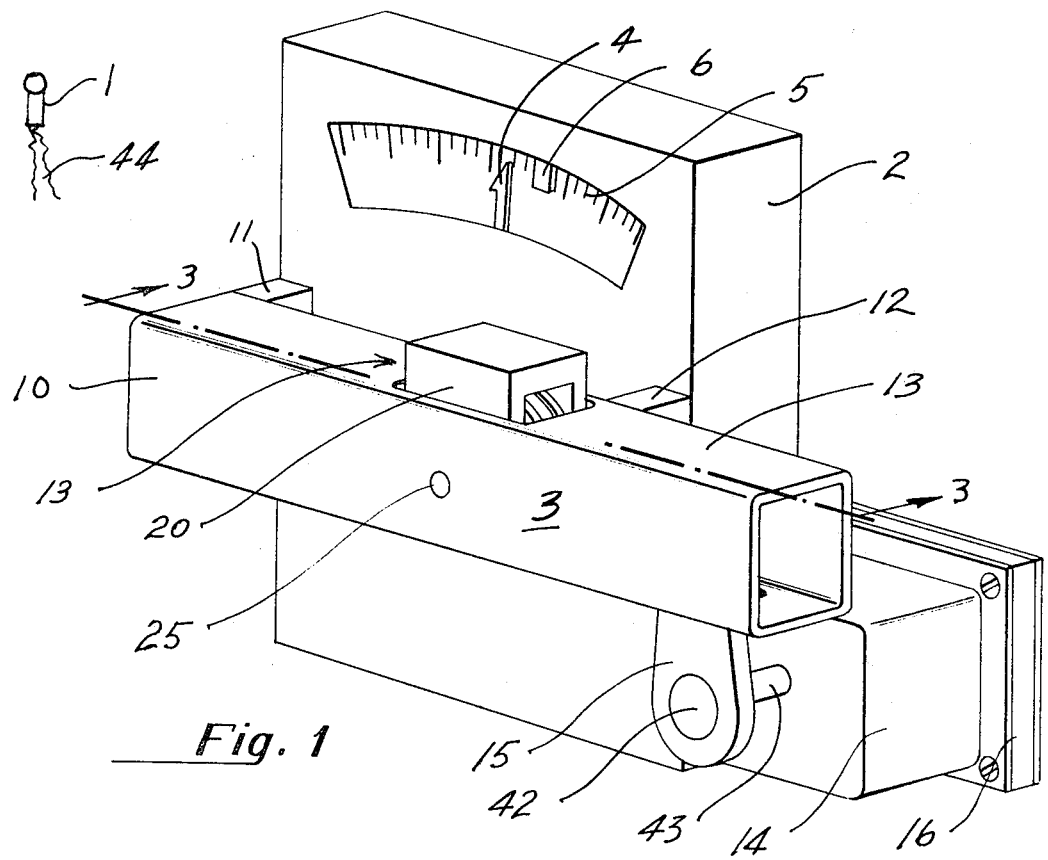

This invention relates to methods and apparatus for controlling the temperature in an oven containing a part whose temperature is to be affected, the temperature of the oven being controlled as a function of the actual temperature of the article.

The invention provides for raising the temperature of the article over a period of time at a desired rate, or maintaining a fixed temperature condition by supplying heat to the oven only when directed to do so by the actual temperature of the article itself. Conversely, the invention provides for the cooling of a heated article over a period of time by supplying heat when the temperature of the article directs that the same is losing heat too fast.

The invention has a special utility for the changing of the temperature of materials which are excellent thermo-insulators and require extended periods of time to bring the inside and surface temperature to substantially the same level. Typical examples of such articles, which are widely used for testing and research purposes, are photoelastic materials such as CR–39 and epoxy resins.

The conventional way of raising the temperature of materials of the kind in question is to supply heat so that the temperature of the furnace rises at a given rate. Conversely, the conventional way of cooling materials of the kind in question is to control the furnace temperature so that it drops a desired rate. For the most part the rates of heating or cooling are more or less empirical in that they are based on rates determined by calculations or experiments.

Thus, the conventional techniques contemplate supplying heat to an oven at some predetermined rate with the fond hope that the article or specimen will absorb or lose heat in a manner so that it will not physically deform or fracture.

I have further found that the conventional system above described is essentially unsatisfactory in that the theoretical rates of heating and/or cooling do not take into account factors such as the size and shape of specimen material, oven construction which may be conducive to undesirable heat loss, inadequate or faulty furnace controls and the human element. The factors are invariably encountered in practice and vary widely as between furnace or oven installations.

The result of this is a high rate of specimen damage either on the heating or cooling cycle. This is highly wasteful and expensive because most specimens of the kind in question are expensive to manufacture and the typical heating cycle may run over a period of two weeks with the damage occurring near the end of the period.

Thus, the conventional techniques involving fixed heating and/or cooling rates which neglect or discount the practical variables is inadequate and undesirable.

In contrast to the foregoing, the present invention contemplates raising the temperature of an article over a period of time by supplying heat and at times which are determined by the temperature of the article itself.

In accomplishing the foregoing, the invention utilizes a thermo-couple connected to the article to be heated and developing a signal for driving the needle of the pyrotroller, the pyrotroller contactor is moved along the scale by a mechanism moving the contactor at some desired rate. When the needle and contactor are disengaged, the pyrotroller power contacts are adapted to close and thereby cause the furnace element to supply heat and when the needle and the contactor are engaged the power contacts open so that the furnace element is quiescent. Therefore, heat is supplied to the furnace only when called for by the temperature of the article itself. The article cannot be heated or cooled at a level or rate which will cause damage.

Figure 2:
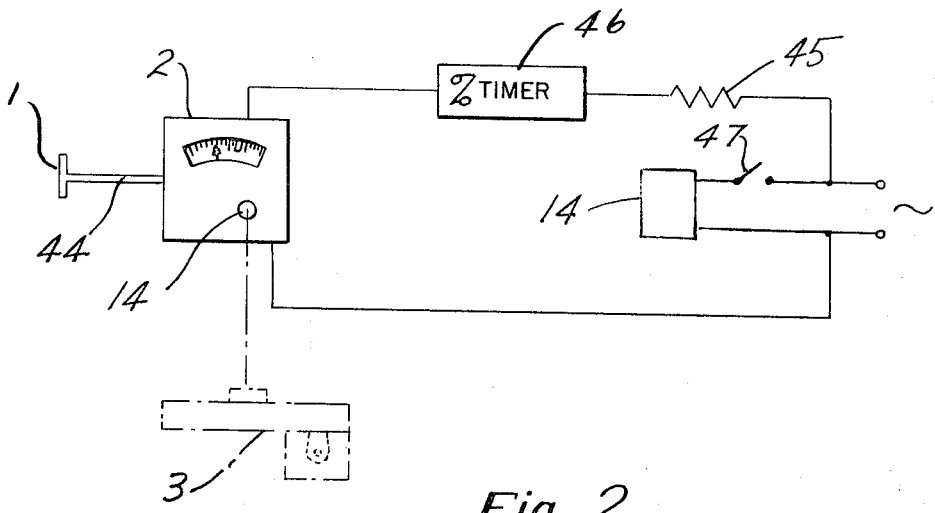

The invention will be described in connection with the following drawings wherein:

FIG. 1 is a prospective view of certain components of the invention;
FIG. 2 is a diagrammatic circuit diagram;
FIG. 3 is a view taken along the lines 3—3 of FIG. 1;
FIG. 4 is a view taken along the lines 4—4 of FIG. 3;
FIG. 5 is an exploded view of certain of the components shown in FIGS. 3 and 4.

With reference to FIG. 1 the equipment of the invention includes a thermo-couple 1, a pyrotroller 2 and a pyrotroller drive mechanism 3.

The thermo-couple 1 is of conventional form being adapted to be secured to the article whose temperature is to be sensed and develop an electrical signal as a function of the temperature. The article or specimen, of course, is mounted in a furnace or oven not shown.

The pyrotroller 2 is of conventional form having an indicating needle 4 adapted to move over the temperature indicating scale 5 and a contactor 6 also movable over the scale and lying within the path of motion of needle 4. When the thermo-couple is electrically connected with the pyrotroller, the needle is to be adapted to be driven over the scale as a function of the temperature. The needle 4 and contactor 6 are electrically connected with a relay which is adapted to be energized and de-energized and thereby open and close the pyrotroller power control contacts. When the needle 4 and contactor 6 are disengaged (as shown) the power control contacts are closed and when the needle and contactor are engaged the power control contacts are open.

In the present arrangement the power control contacts are electrically interconnected with the electrical heating element of the furnace. The heating element is energized and de-energized in accordance with the closure and opening of the power control contacts. Thus, when the needle 4 and contactor 6 are disengaged, the power control contacts are closed and the heating element is energized and supplies heat to the furnace. When the needle 4 and contactor 6 are engaged the power control contacts are open and the heating element is quiescent or de-energized.

The function of the drive mechanism 3 is to move the contactor 6 over the pyrotroller scale by rotating the usual contactor knob. Under ordinary circumstances, the knob is moved manually to set the contactor 6 at some desired position on the scale.

The drive mechanism includes an elongated hollow housing 10 connected to the pyrotroller by the blocks 11 and 12, a knob driver generally indicated at 13, and a motor 14 adapted to operate a rod 15 connected to the knob driver. The motor 15 is mounted on plate 16 fixed to the pyrotroller. As best indicated in FIG. 5, the knob driver includes the yoke 20, rocker arm 21, drive disc 22, jamb pins 23 and 24 and (FIG. 4) the drive pin 25.

As best noted in FIG. 4 the pyrotroller knob used for moving the contactor 6 is indicated by dot and dash lines 26. The knob is cradled within the drive pin 25 so that when the pin 25 is rotated the knob is rotated therewith.

The drive pin 25 is adapted to be rotated in the clockwise or counterclockwise direction by the rotation of the drive disc 22 which is fixed to the pin by the set screw 27. As will be observed, the pin 25 extends through the housing 10 and apertures in the side walls of the housing form bearings for rotatably supporting the pin and disc. The disc 22 is rotated as explained following.

The yoke 20 straddles the rocker arm 21. The disc 22 is disposed in a cavity 19 in the rocker arm 21. The disc is nested within the yoke. The disc 22 has apertures 30 which accommodate the pin 25 and provide for the yoke to be rotatable relative to the disc. The disc extends upwardly through an aperture 31 (FIG. 3) in the top of the housing 10. The yoke has two rotational positions. The left hand position is indicated by the dot and dash lines 32 and the right hand position by the dot and dash lines 33. The left and right positions are determined by the engagement of the yoke with the edges of the aperture 31.

The arm 21 is disposed within the yoke and the arm has apertures 34 which accommodate the pin 25 in a manner so that the arm can rotate relative to the pin. Also, the arm 21 has pairs of apertures 35 and 36 through which extend the jamb pins 23 and 24. As noted in FIG. 4 the pins 23 and 24 are retained by the side walls of the rocker arm 21. As best indicated in FIG. 3 the pin 23 (in the position shown) is adapted to engage the apertures 35 and the outer surface of the disc 22. The pin 24 (in the position shown) is adapted to engage the apertures 36 and the outer surface of the disc 22.

The pin 23 is held in the position shown in FIG. 3 by the feet 40 which engage the pin when the yoke 20 is tipped to the right. At this time the pin 24 can drop down slightly between the apertures 36 and the outer surface of disc 22.

The pin 24 is held in the position shown in FIG. 3 by the feet 41 which engage the pin when the yoke 20 is moved to the left hand position. At this time the pin 23 can drop down slightly between the apertures 36 and the outer surface of disc 22.

The left hand position of the yoke 20 is for moving the knob 26 so that the position of the yoke 20 is for moving the knob 26 so that the contactor 6 will move up scale (temperature rise) and the right hand position is moving the contactor down the scale (temperature fall). Accordingly, the yoke is provided with the letters C and H on the left and right hand sides, the letter in the topmost position indicating the manner in which the pyrotroller knob is to be driven.

The right hand end of the rocker arm 21 is pivotally connected with the rod 15 mounted on an eccentric 42 fixed to the drive shaft 43 of the motor 14. The motor 14 rotates the eccentric and causes the arm 15 to oscillate up and down and thereby cause rocking of the arm 21 about the axis of the pin 25.

The motor 14 is of conventional form comprising a synchronous motor with a changeable gear train connecting the rotor and the shaft 43. By selecting the proper gears the shaft 43 can be made to rotate between extremely wide limits. For example, to make a complete rotation in ten seconds or a complete rotation in seventy-two hours.

The rotary or rocking motion of the arm 10 causes rotation of the disc 22, pin 25 and pyrotroller knob 26, as follows.

Assume that it is desired to rotate the contactor 6 up the scale 5 (increasing temperature). The yoke 20 is tilted to the left hand position. In this position the pin 23 drops down slightly between the surface of the disc 22 and the aperture 35 and the pin 24 is cradled by the feet 41 in the position shown. The arm 21 is rotated clockwise, the space between the outer surface of the disc 22 and aperture 35 will tend to close and the jamb pin 23 will be jammed between the aperture and the disc surface causing the disc to rotate clockwise with the arm. This will cause the pyrotroller knob 26 to also rotate clockwise and accordingly move the contactor along the scale. If the arm is moved counterclockwise, the space between the disc and aperture will tend to open so the pin 23 will simply roll and there will be no jamming effect, hence, no motion of the disc. With respect to the pin 24, clockwise or counterclockwise rotation has no jamming effect because the space between disc and aperture 36 do not change. The disc 22 rotates through 180° of rotation of the eccentric 42 and is stationary for the next 180° and so on. In other words, the rotation is intermittent.

When it is desired to move the contactor 6 down scale, the yoke 20 is moved to the right hand position. The pin 24 drops down slightly between the surface of the disc and the aperture 36 and the pin 23 is cradled by the feet 40 in the position shown. When the arm is moved counterclockwise, the space between the disc and aperture 36 decreases and the pin 24 jams and causes the disc to move counterclockwise and accordingly move the pyrotroller knob 26 counterclockwise. Clockwise motion of the arm 21 will not cause jamming of either pin for reasons explained heretofore. The rotation of the disc is intermittent.

Thus, it will be seen I have provided a drive mechanism whereby the pyrotroller contactor 6 can be moved either up or down scale 5 by appropriately setting the yoke 20. The rate of movement on the scale of the contactor is determined by the power gear system selected for use with the motor 14. For example, the gear train can be arranged so that the contactor will be moved along the scale at a relatively slow rate such as one-tenth of a degree per hour or at a relatively higher rate such as one-quarter degree per hour.

In FIG. 2, I have diagrammatically illustrated the electrical connections for using the equipment of the invention with a furnace. For example, the thermo-couple is electrically connected to the pyrotroller 2 by the leads 44 and the furnace heating element 45 is electrically connected to the pyrotroller through the percent timer element 46. The motor 14 is electrically connected to the power line through the switch 47.

The timer 46 and switch 47 play an important functional part in the invention.

The invention contemplates supplying heat to the furnace in a pulsed fashion. This is advantageous because I have found that materials of the kind in question respond more desirably when heat is applied intermittently. Furthermore, the arrangement provides for a peak furnace temperature.

The percent timer 46 is of conventional structure and will provide power to be supplied to the heating element 45 a percentage of each minute depending on the percent setting.

The switch 47 connected with the motor 14 is important in that it provides for maintaining the furnace temperature in a stable condition. For example, if the switch 47 is open the pyrotroller contactor 6 will remain fixed and consequently the needle will make and break contact with the contactor 6 in accordance with the specimen temperature and thereby maintain the same at the desired level.

In summary, it will be apparent I have provided a means for a furnace or oven control which operated in accordance with the temperature of the article or specimen whose temperature is being affected. With the arrangement shown, the specimen or article temperature can be brought up to a desired level without danger of destroying or damaging the specimen and then maintaining the temperature at some desired level over any period of time or by immediately starting the cooling of the specimen by causing the contactor 6 to move down scale.

When the contactor is moved down scale the needle 4 will normally be in engagement so that no heat will be supplied. However, if for one reason or another the heat loss from the specimen is too rapid, the needle will move away from the contact and heat will be supplied to the furnace so as to reduce the rate of heat loss.

I claim:
1. In a temperature control system, a pyrotroller and a mechanism to intermittently move the pyrotroller contactor drive knob comprising:
   a motor secured to the pyrotroller;
   a drive pin engaging the pyrotroller contact knob to provide for rotation thereof;
   means connected with the pyrotroller and rotatably mounting said drive pin;
   a rocker arm mounted on said pin for relative motion with respect thereto, the rocker arm having a cavity;
   means connecting the rocker arm with said motor to intermittently reciprocate the arm about the axis of said drive pin;
   a disc within said cavity and fixed to said pin so that a rotary motion of the disc causes rotary motion of the pin;
   a yoke straddling said rocker arm and mounted on said pin for relative motion with respect thereto as between first and second positions, the yoke having first and second support feet on opposite sides thereof;
   means forming pairs of apertures in said rocker arm;
   first and second pins extending respectively through said pairs of aperture means and engaging the sides thereof and also engaging the disc on substantially opposite edges thereof;
   when said yoke is rotated to the first position, the first support feet being spaced from said first pin and the second support feet engaging the second pin whereby rotation of said rocker arm in one direction causes jamming of the first pin between the aperture and the disc and a rolling of the second pin so that the disc rotates with the rocker arm;
   when said yoke is rotated to the second position, the second support feet being spaced from said second pin and said first support feet engaging the first pin whereby the rotation of the rocker arm in the opposite direction causes jamming of the second pin between the aperture and the disc and a rolling of the first pin so that the disc rotates with the rocker arm.

References Cited

UNITED STATES PATENTS

| | | | |
|---|---|---|---|
| 1,578,280 | 3/1926 | Gibson | 236—70 |
| 2,232,202 | 2/1941 | Bean | 236—46 |
| 2,505,038 | 4/1950 | Gilley | 236—46 |
| 3,409,217 | 11/1968 | Gentry | 236—15 |

WILLIAM E. WAYNER, Primary Examiner

U.S. Cl. X.R.

236—46; 74—118